F. O'NEILL.
MACHINE FOR MANUFACTURING GLASSWARE.
APPLICATION FILED DEC. 7, 1912.
1,147,539.
Patented July 20, 1915.
5 SHEETS—SHEET 1.
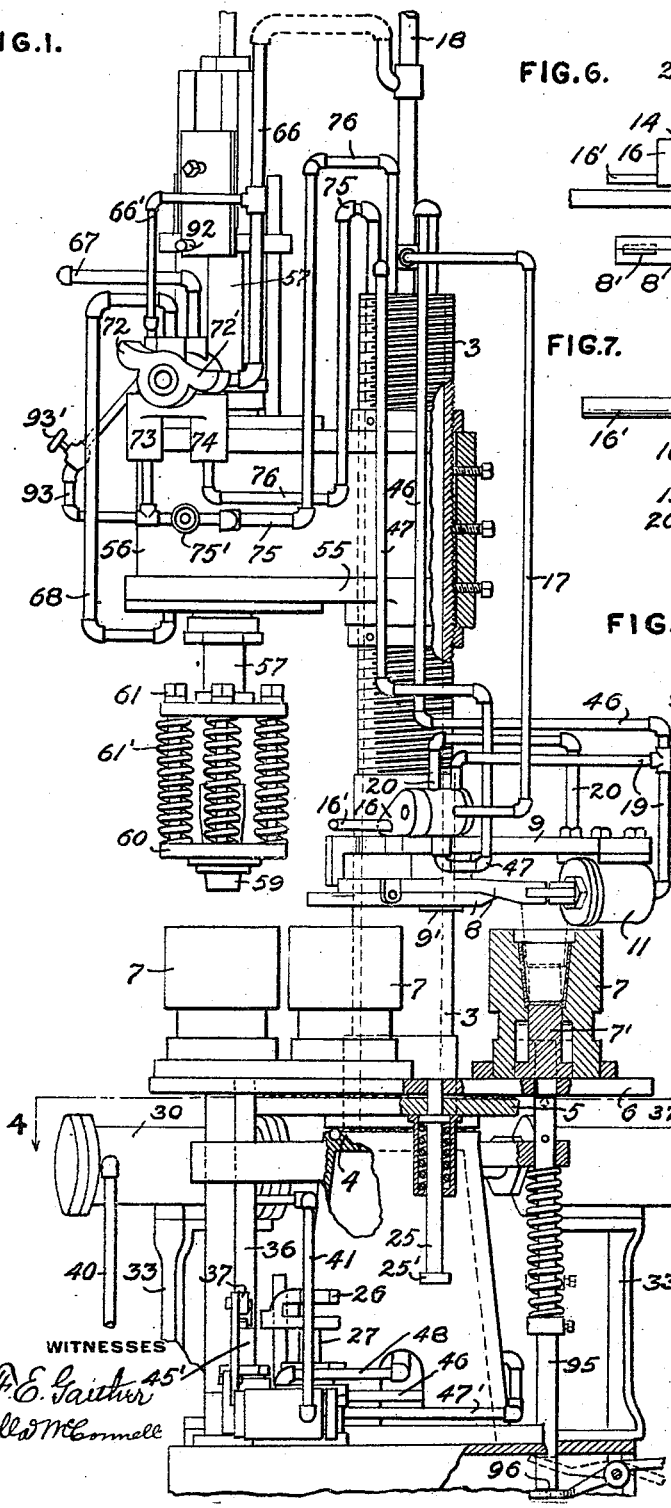
FIG.1.
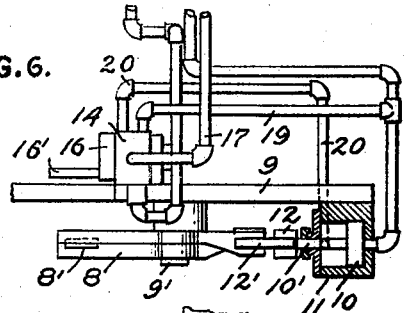
FIG.6.
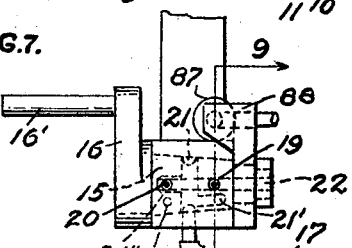
FIG.7.
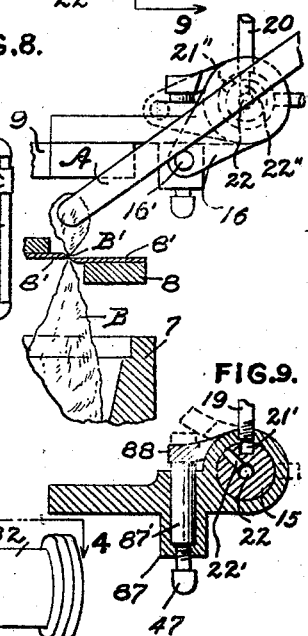
FIG.8.
FIG.9.
WITNESSES
F. E. Gaither
Ella McConnell
INVENTOR
Frank O'Neill
By J. M. Nesbit
atty

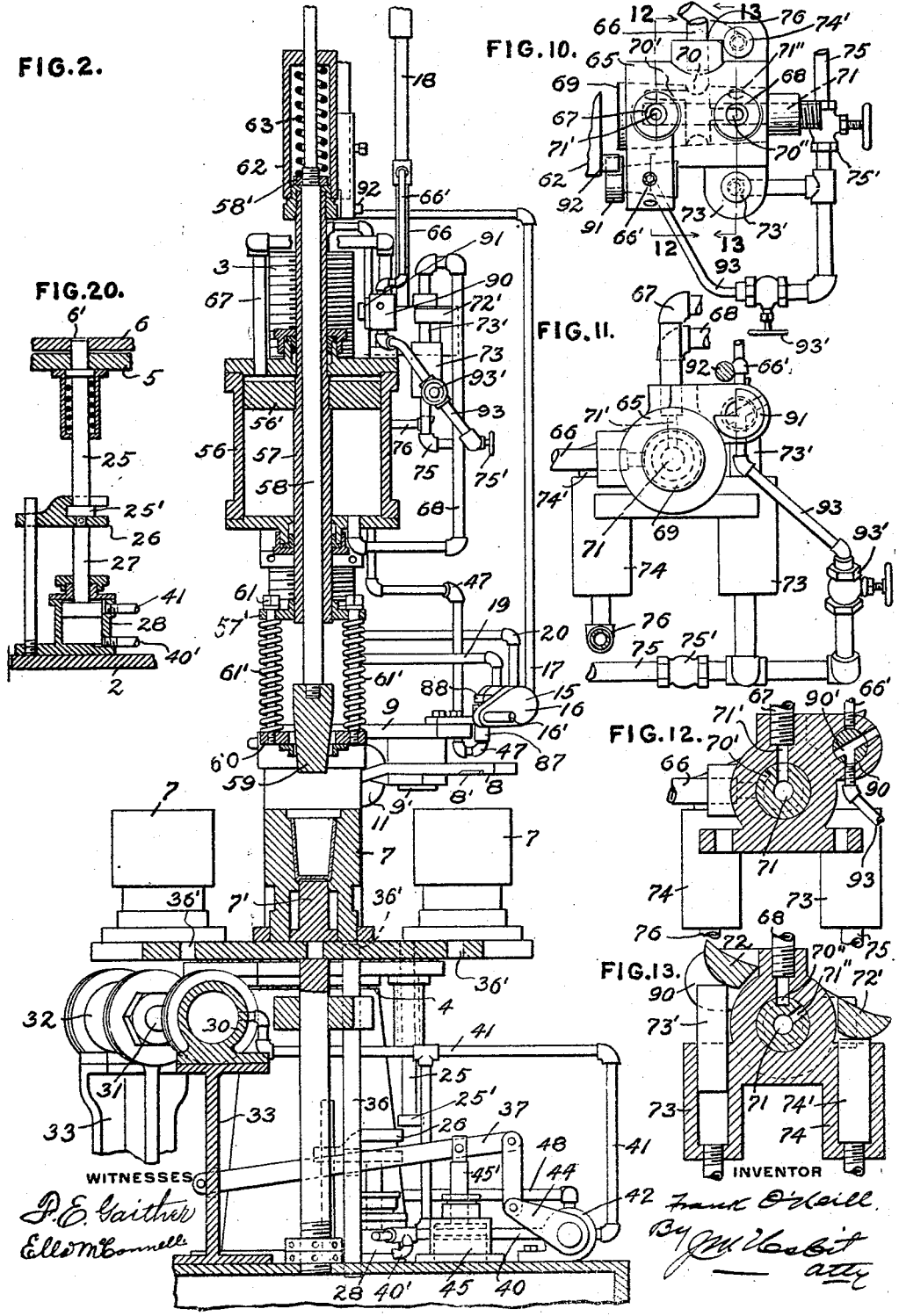

F. O'NEILL.
MACHINE FOR MANUFACTURING GLASSWARE.
APPLICATION FILED DEC. 7, 1912.

1,147,539.

Patented July 20, 1915.
5 SHEETS—SHEET 3.

WITNESSES

INVENTOR

F. O'NEILL.
MACHINE FOR MANUFACTURING GLASSWARE.
APPLICATION FILED DEC. 7, 1912.

1,147,539.

Patented July 20, 1915.
5 SHEETS—SHEET 4.

WITNESSES
F. E. Gaither
Ella McConnell

INVENTOR
Frank O'Neill
By J. H. Nesbit
Atty

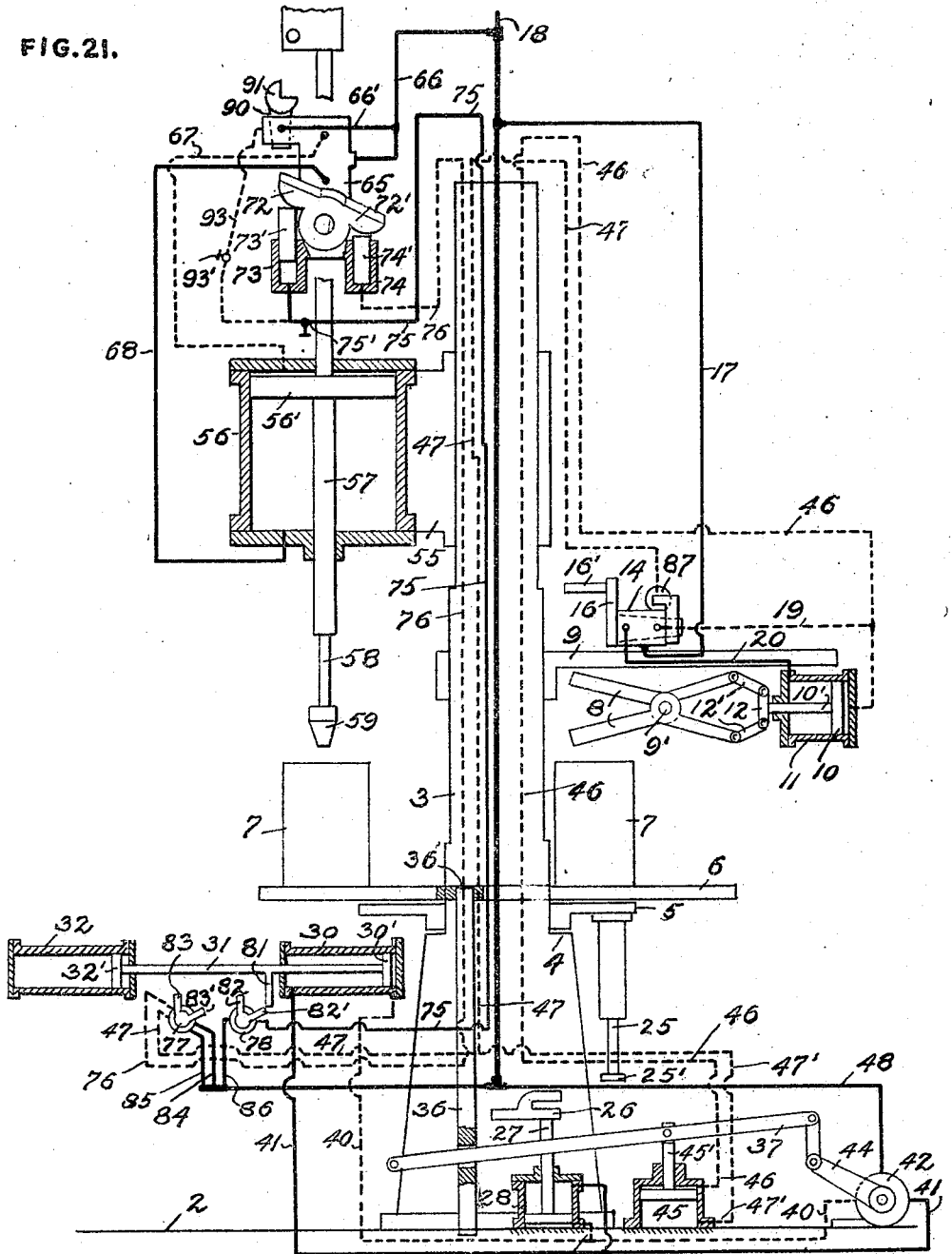

UNITED STATES PATENT OFFICE.

FRANK O'NEILL, OF TOLEDO, OHIO.

MACHINE FOR MANUFACTURING GLASSWARE.

1,147,539.  Specification of Letters Patent.  Patented July 20, 1915.

Application filed December 7, 1912. Serial No. 735,410.

*To all whom it may concern:*

Be it known that I, FRANK O'NEILL, a resident of Toledo, in the county of Lucas and State of Ohio, have invented certain new and useful Improvements in Machines for Manufacturing Glassware, of which the following is a specification.

This invention relates to a machine for pressing glass articles which may be fully formed by such pressing, or only partially formed thereby and completed by blowing or other shape-imparting manipulation, all as well known in the art.

One object of the invention is to provide automatic means for performing a complete cycle of operations, whereby when the machine is set in motion following the placing of a quota of molten glass in a mold which is in receiving or charging position the mold is advanced to pressing position, such movement also advancing the preceding mold from pressing position. After the charged mold reaches pressing position the pressing plunger is lowered thereinto and from that position it may be instantly retracted, or such retraction may follow an appreciable pause of the plunger within the mold, as may be desired. The final operation of the cycle results in placing all of the parts again in starting position. While a complete cycle of operations includes the several operations thus generally referred to, the invention is not restricted thereto as the several mechanisms by which such operations are performed may be variously employed or grouped.

The invention includes mechanisms of novel construction for severing a quota of glass from the gather; for actuating the mold carrier; and for operating the pressing plunger.

Also included in the invention are sundry valves, valve actuating devices, and connections for admitting and exhausting compressed air which actuates the sundry valves and devices for accomplishing the several operations to which reference has been made.

Figure 3:
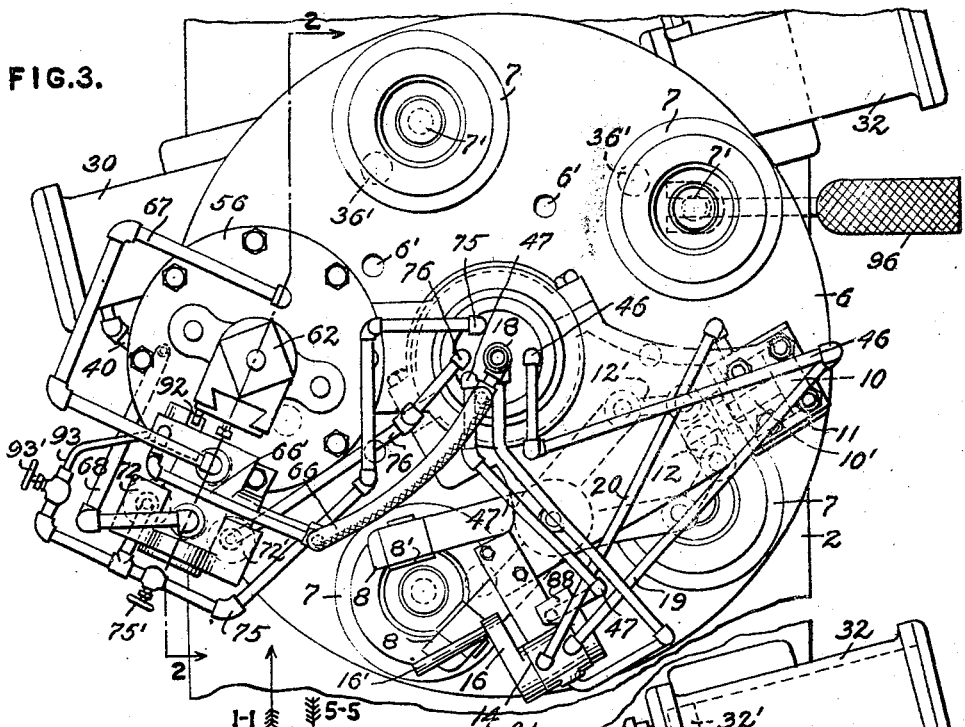
Figure 4:
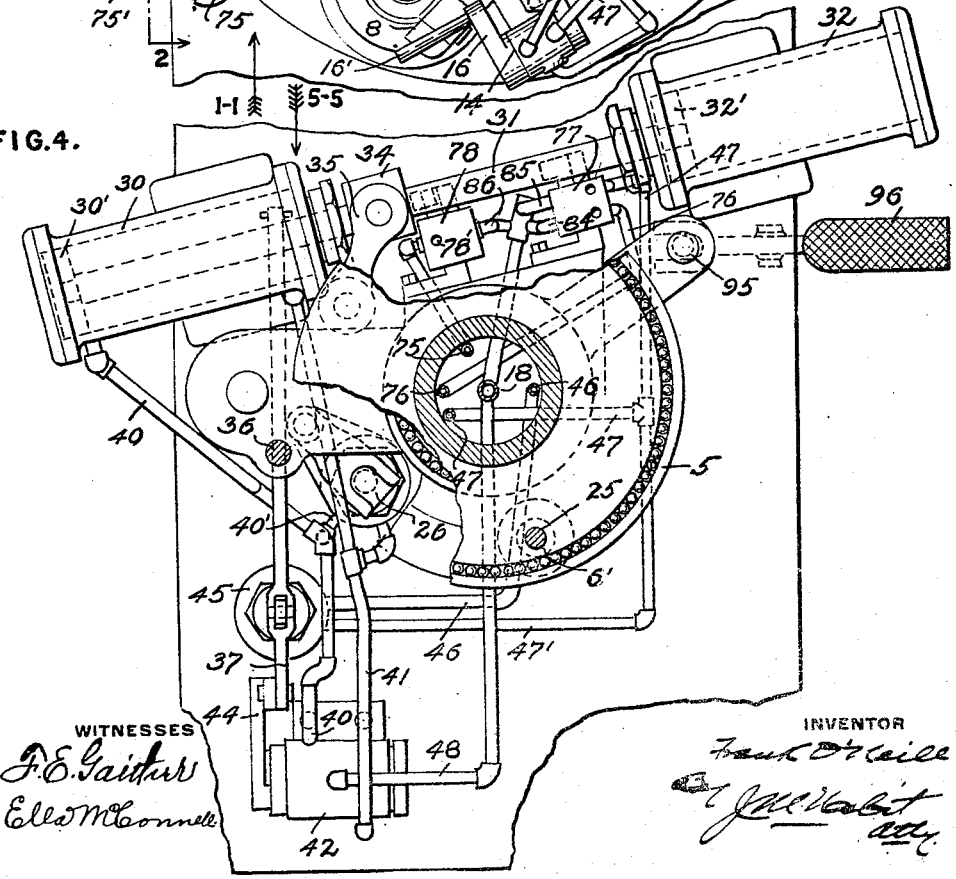
Figure 5:
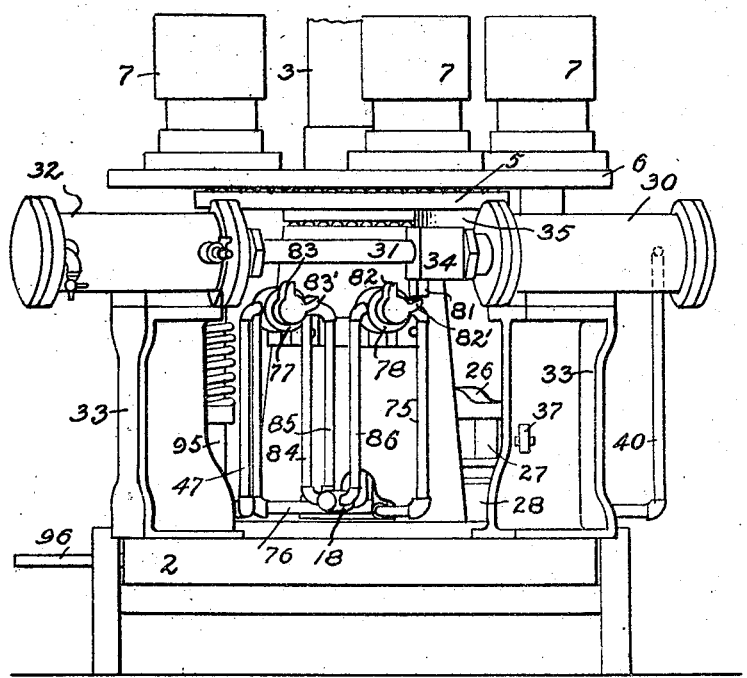
Figure 14:
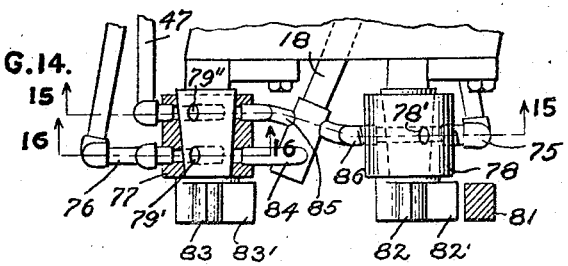
Figure 16:
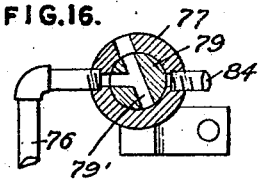
Figure 15:
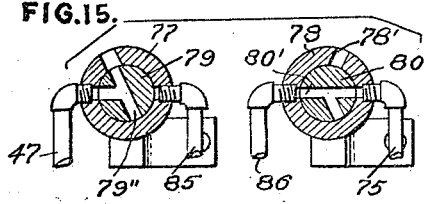
Figure 17:
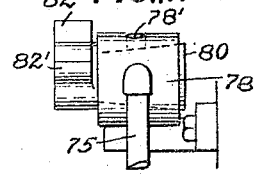
Figures 18, 19:
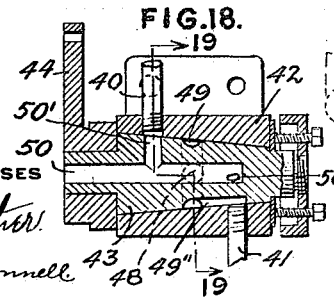

In the accompanying drawings, Figure 1 is a view of the machine in elevation looking in the direction of arrow 1—1 of Fig. 3, portions of the mechanism being shown in section, and Fig. 2 is an elevation partly in section, looking in the direction of arrow 2—2 of Fig. 3. Fig. 3 is a top plan of the machine, and Fig. 4 is a sectional plan on line 4—4 of Fig. 1. Fig. 5 is an elevation of the lower portion of the machine looking in the direction of arrow 5—5 of Fig. 4. Figs. 6, 7, 8 and 9 are detail views of the initial valve mechanism and the glass shearing mechanism. Fig. 9 being a section of the valve mechanism taken on line 9—9 of Fig. 7. Figs. 10, 11, 12 and 13 illustrate details of the valve mechanisms which control the operation of the pressing plunger, Figs. 12 and 13 being sections taken on lines 12—12 and 13—13, respectively, of Fig. 10. Fig. 14 is a sectional plan of the valves which are operated by the mold advancing mechanism. Figs. 15 and 16 are vertical sections on lines 15—15 and 16—16, respectively, of Fig. 14. Fig. 17 is a side elevation of one of the valves shown in Fig. 14. Figs. 18 and 19 are sectional detail views of the valve which controls the movement of the mold actuating mechanism. Fig. 19 being taken on line 19—19 of Fig. 18. Fig. 20 is a sectional elevation of the carrier advancing bolt and mechanism for retracting the same. Fig. 21 is a diagrammatic view of the machine with the parts in normal or starting position, the several pipes containing compressed air in such position being shown in full lines, and the pipes not then under pressure in dotted lines.

Referring to the drawings, 2 designates the base on which the machine is mounted and from which rises a central column 3. The lower portion of the column is enlarged to provide an annular ledge for bearing 4 of horizontal carrier-actuating plate 5, and superposed on a ball bearing on this plate is carrier or table 6 for molds 7, all as shown in Figs. 1 and 2. The mechanism for intermittently rotating carrier 6 by means of plate 5 will be presently described.

*Glass severing mechanism.*—The invention as here embodied includes mechanism for severing a quota of molten glass from a gather, the molds, successively, being positioned beneath such mechanism to receive the severed glass. Referring to Figs. 1, 2, 3 and 6, it will be seen the coöperating shear blades 8 of the severing mechanism are pivoted at 9' to the under side of shelf or bracket 9 projecting from column 3, the shears being actuated by piston 10 in cylinder 11 secured to the under side of bracket 9, rod 10' of the piston carrying a cross-head 12 which is connected to the rear extremities of the shears by links 12'. The shears may be of any desired construction. As here shown the shear arms are provided with the blade elements 8'.

Air under pressure for the shear operating cylinder is controlled by valve 14, Figs. 1, 6, 7, 8, 9 and 21. The piston 15 of said valve carries at one end crank arm 16 from which projects pin 16'. Air is communicated to valve 14 through pipe 17 leading from the compressed air main 18 above and extending downwardly into column 3. Also extending from valve 14 are pipes 19 and 20, the former leading to the outer end of cylinder 11, and pipe 20 to the inner end thereof, Figs. 6 and 21. Piston 15 is ported circumferentially at 21, Fig. 7, to receive air from pipe 17, with branch ports 21' adapted to register with pipes 19 and 21" for pipe 20. Piston 15 is formed with the axial exhaust port 22, Figs. 7 and 9, with branch 22' thereof for pipe 19 and branch 22" for pipe 20, the arrangement being such that when air is being communicated to one end of cylinder 11 the opposite end is open to the exhaust, and vice versa. In the positions shown in Figs. 6 and 7 the air pressure is in communication with the inner end of cylinder 11 with the outer end open to the exhaust and with shears 8 open, while in Figs. 8 and 9 the parts are in a reverse position, the valve having been turned to the full line position of Fig. 8 by the operator bearing on pin 16' with the glass gathering punty A, thereby severing the gather at B', the proper quota B of molten glass dropping into mold 7.

The depression of valve arm 16 by the gathering pontil causes the first of a cycle of operations of the machine to be performed, and causes the other operations to be performed in order, such operations being accomplished, in the main, by the mold carrier actuating mechanism and the plunger mechanism.

*Mold carrier actuating mechanism.*—I will now describe the mold carrier actuating mechanism and the means which causes it to be energized by operating valve 14. Mold carrier 6 is rotated through the medium of rotatable plate 5 located immediately therebeneath, plate 5 carrying the spring-raised bolt 25, Figs. 1, 2, 4 and 20, which is adapted to engage, successively, holes or sockets 6' in the carrier. For retracting the bolt from engagement with the carrier its headed lower end 25' is adapted to be embraced by fork 26 on the upper end of piston rod 27 the piston thereof being movable vertically in cylinder 28 mounted on base 2. The air connections for said cylinder for raising and lowering fork 26 will be presently described.

Beneath plate 5 is horizontal power cylinder 30 having its piston 30' connected to the elongated rod 31, the outer end of the rod being connected to piston 32' of cushioning cylinder 32, all as clearly shown in Figs. 4 and 5, cylinders 30 and 32 being supported on base 2 by posts or uprights 33. A head 34 on rod 31 is connected by link 35 with the under side of plate 5. The travel of piston rod 31 is such as to move plate 5 and carrier 6 a distance corresponding to the distance between the centers of adjacent molds 7. When rod 31 is in starting position, as in Fig. 4, bolt 25 is in engagement with carrier 6 and is positioned forwardly from the bolt retracting fork 26 a distance corresponding to the space between adjacent mold centers. The forward movement of rod 31 advances plate 5 and with it bolt 25 and carrier 6 a fifth of a revolution, placing the headed end 25' of the bolt in the then elevated fork 26, and before rod 31 is retracted by the backward movement of piston 30' fork 26 and bolt 25 are lowered by cylinder 28 so that carrier 5 may move backwardly free of the carrier, bolt 25 being thereby moved out of alinement with socket 6' before it disengages fork 26, but after such disengagement it bears upwardly on the under side of the carrier and on the completion of the backward movement of plate 5 it reaches and enters the next socket 6'. The carrier is locked in its advanced position by bolt 36 located therebeneath and movable vertically by lever 37, the bolt engaging one of a circular series of sockets 36', Fig. 2, in the carrier.

Air is admitted to and exhausted from the outer end of cylinder 30 through pipe 40, and the opposite end of the cylinder is similarly served by pipe 41, pipes 40 and 41 extending from valve 42, Figs. 2 and 21. Piston 43 of this valve carries arm 44 which is connected to lever 37, and the latter, in turn, is operated by piston rod 45' of cylinder 45. The upper end of cylinder 45 receives and exhausts air through pipe 46 which branches from pipe 19 that connects valve 14 with the outer end of cylinder 11, and the lower end of cylinder 45 is served by branch 47' of pipe 47. The connections of pipes 47 will be presently described.

From the foregoing it will be seen that upon admitting air through pipe 19 to the outer end of cylinder 11, Fig. 21, for operating shears 8, air is at the same time conducted through pipe 46 to the upper end of cylinder 45, thereby depressing its piston rod 45' and lowering lever 37. The downward movement of this lever retracts the carrier-locking bolt 36 and at the same time turns piston 43 of valve 42 into position to pass air from branch 48 of main 18 into pipe 40 which leads to the outer end of cylinder 30. The air in pipe 40 extends through branch 40' into the lower end of cylinder 28, thereby raising fork 26 into the path of bolt 25 which is advanced toward it by the forward movement of piston 30', resulting from the admission of air to cylinder 30 through pipe 40.

Bearing in mind that valve 14 is operated by the gather depressing crank pin 16' with gathering pipe A, it will be seen that valve 14 is operated to cut off a quota of glass and at the same time valve 42 is operated which results in unlocking carrier 6; in admitting air to cylinder 30 for advancing the carrier and thereby moving the charged mold from glass-receiving to pressing position; and in raising the bolt retractor for disengaging the carrier-moving mechanism from its actuating mechanism so that the latter will be free for its return movement.

Valve 42, shown in detail in Figs. 18 and 19, is of the same general type as valve 14. Its piston 43 is ported circumferentially at 49 to maintain constant communication with compressed air connection 48, and with branch 49' thereof adapted to establish communication with pipe 40 extending to one end of cylinder 30, and with another branch 49" for establishing communication with pipe 41 leading to the opposite end of said cylinder. Piston 43 is formed with axial exhaust port 50, branch 50' thereof being adapted to communicate with pipe 40, with another branch 50" for exhausting pipe 41.

*Pressing plunger mechanism.*—An arm or bracket 55 projecting from column 3, Figs. 1, 2 and 3, supports cylinder 56 with piston 56' thereof secured to sleeve 57, and with rod 58 extending through the sleeve and carrying plunger 59. Sleeve 57 carries the usual spring plate and mold cover 60 which is yieldingly supported on head 57' of sleeve 57 by bolts 61 and springs 61'. To afford plunger rod 58 a yielding movement within sleeve 57 in order to compensate for variations in the quantity of glass in the mold, sleeve 57 carries at its upper end a cage 62 through which rod 58 extends, with spring 63 confined in the cage above stop 58' on rod 58. Thus, although sleeve 57 moves positively with piston 56' and hence has the same vertical throw each time it operates, the plunger and plunger rod may yield upwardly and thus compensate for variations in the amount of glass being pressed.

Valve 65 for controlling the movements of the plunger is illustrated in detail in Figs. 10 to 13, also Fig. 21. Air is communicated to valve 65 through pipe 66 leading from the compressed air main 18, and said valve is connected to the upper end of cylinder 56 by pipe 67 and to its lower end by pipe 68. Piston 69 of valve 65 is ported circumferentially at 70, Fig. 10, to maintain communication with the air inlet 66, with a branch 70' adapted to communicate with pipe 67 leading to the top of cylinder 56 and another branch 70" for communicating with pipe 68 extending to the bottom of said cylinder. Valve 69 is formed with the axial exhaust port 71 which has branches 71' and 71" adapted, respectively, to communicate with pipes 67 and 68.

Valve 65 is operated automatically in reverse directions by air pressure which is controlled by the movement of the mold-carrier actuating rod 31. To accomplish this, valve piston 69 is provided at one end with the oppositely projecting wings 72 and 72', Figs. 1, 13 and 21. For holding the plunger raised as in Figs. 1, 2 and 21, wing 72 is tilted upwardly and wing 72' downwardly, wing 72 being raised by piston 73' of cylinder 73, while the position of valve 65 is reversed by piston 74' of cylinder 74 raising wing 72'. A pipe 75 extends from cylinder 73 to a valve 78, and a pipe 76 extends from cylinder 74 to valve 77.

The control of the pressing mechanism by the movement of the carrier-actuating rod 31 is effected by means of the two above mentioned valves 77 and 78, Figs. 5 and 14 to 17, inclusive. The pistons 79 and 80, respectively, of valves 77 and 78 are operated by a trip or knocker 81 projecting downwardly from head 34 on rod 31 which is adapted to engage arms 82 and 82' on piston 80 and similar arms 83 and 83' on piston 79. Two pipes 84 and 85 extend from compressed air main 18 to valve 77, while valve 78 is connected to said main by pipe 86.

The ports of valve pistons 79 and 80 are shown in Figs. 14 to 17. Piston 80 of valve 78 is ported at 80' to connect pipes 86 and 75 when the machine is in position to start a cycle of operations, as in Figs. 5, 14, and 15, also Fig. 21, the air thus admitted to pipe 75 entering the bottom of cylinder 73 and holding piston rod 73' thereof and wing 72 of valve 65 raised. A port 79' in piston 79, Fig. 14, is at the same time maintaining pipes 84 and 76 out of register, excluding air from cylinder 74 which operates on valve 65 oppositely to cylinder 73. At the same time another port 79" in piston 79 maintains pipes 85 and 47 out of register, Fig. 15, thereby excluding air from said pipe 47.

Pipe 47 extends to a cylinder 87 which has its piston 87' arranged to lift tail-piece 88 on piston 15 of valve 14, Figs. 7, 8 and 9, for restoring said valve to normal or starting position after it has been moved from such position by gathering iron A depressing crank 16.

*Valve operations resulting from movement of piston rod 31.*—Upon the forward movement of piston rod 31, knocker 81 first engages arm 82 of the piston of valve 78, Figs. 5 and 21, and rocks the piston sufficiently to close communication between pipes 86 and 75 with the branched piston port 80' establishing communication between pipe 75 and the atmosphere through exhaust port 78' and valve 78, Fig. 15, thus leaving piston rod 73' and wing 72 of valve 65 free to lower from the position shown in Fig. 1. Continuing its forward traverse, rod 31, engages arm 83 of the piston of valve 79, thereby rotating the piston sufficiently to establish communication between pipes 84 and 76, and between pipes 85 and 47. The air thus admitted to pipe 76 raises piston rod 74' and wing 72' of valve 65, thereby reversing the position of said valve from that shown in Fig. 13, and so placing its ports as to admit air through pipe 67 to the top of cylinder 56 and exhausting air from the bottom of said cylinder through pipe 68, thereby depressing the plunger actuating piston 56', and causing plunger 59 to press the article within mold 7.

The above described movement of valve 77, which operates valve 65 to cause the depression of plunger piston 56', also establishes communication between pipes 85 and 47, and air flowing through the latter is communicated through branch 47' into the bottom of cylinder 45, Fig. 21, and continuing through pipe 47 the air pressure lifts piston 87', Figs. 6 to 9, and thereby restores valve 14 to its normal or starting position. The elevating of piston rod 45' resulting from admission of air to cylinder 45 through the branch pipe 47' raises lever 37 and restores valve 42 to its normal or starting position, as in Figs. 2, 18, 19 and 21, in which position communication is again established between branch 48 of the compressed air main 18 and pipe 41 leading to the inner end of cylinder 30, thereby causing piston rod 31 to reverse its movement. And upon such reverse movement knocker 81 first engages arm 83' of the piston of valve 77, closing off the supply of air from pipes 76 and 47, and finally on its backward movement knocker 81 engages arm 82' of the piston of valve 78 and rotates the latter sufficiently to re-establish communication between pipes 86 and 75. Valves 77 and 78 are thus restored to normal or starting position, and with air again admitted to pipe 75 it passes to cylinder 73, thereby raising piston rod 73' and shifting valve 65 into starting position, admitting air to the bottom of cylinder 56 and thereby raising piston 56', the upper end of the cylinder exhausting through pipe 67. The entire mechanism is thus restored to the normal or starting position in which it is shown in the several figures of the drawings.

*Means for withdrawing plunger 59 from the mold.*—Two mechanisms are employed for accomplishing this operation, one of which operates much more quickly than the other. This provision is had for the reason that in pressing certain kinds of glass articles it is desirable to quickly—almost instantly—retract the pressing plunger, while for other work it is desirable that the plunger remain within the mold in full pressing position for an appreciable time. The slower of the two methods is that above described, in which valve 65 remains in plunger-pressing position from the time valve 77 is operated by the forward traverse of knocker 81 until said rod and the knocker almost complete their backward traverse when the operation of valve 78 results in admitting air to pipe 75 and thereby reversing the piston of valve 65 through the medium of piston rod 73'.

For instantly retracting plunger 59 valve 75' in pipe 75, Figs. 10, 11, 12 and 21, is closed, and the reverse or backward movement of valve 65 into the position for effecting the raising of piston 56' is accomplished through the medium of supplemental valve 90 which is provided with the notched actuating head 91, which head is operated by stop 92 projecting from spring cage 62 which raises and lowers piston 56', Figs 1, 2, and 11. This valve 90 is ported at 90', Fig. 12, to establish communication between branch 66' of pipe 66, leading from main 18, and pipe 93 leading to cylinder 73, pipe 93 being provided with the valve 93'. Stop 92 is arranged to open valve 90 just as the plunger actuating piston 56' is completing its downward movement, and with valve 93' open and valve 75' closed air is admitted to cylinder 73 immediately upon the completion of the pressing stroke which immediately reverses valve 65 and at once raising piston 56', withdrawing the plunger from the mold. The above described mechanism for lifting the plunger is rendered inoperative by closing valve 93', with the slower operation accomplished by opening valve 75'.

*Mold discharging mechanism.*—Upon each advance of mold carrier 6 the mold 7 containing the pressed article is advanced from its position beneath the plunger, as in Fig. 2, and each mold containing a pressed article is, in turn, positioned over a vertically moving spring-depressed bar 95, Fig. 1, which is raised by depressing the foot treadle 96, Figs. 1, 3, and 4. Upward movement of bar 95 lifts the mold bottom or valve 7', Fig. 1, raising the pressed article so that it may be readily removed, as in dotted lines, Fig. 1.

From the foregoing description, taken in connection with the drawings, it will be seen that the machine accomplishes a complete cycle of operations following the operation of valve 14 by downward pressure from the gathering iron A, at the completion of such cycle the machine being in initial or starting position ready to repeat the same. The several operations are performed automatically, the mechanism taking care of the entire work after valve 14 is operated. Nothing is required of an operator other than to adjust valves 75' and 93' for either a quick or a more deliberate withdrawal of the pressing plunger, also the depression of treadle 96 for lifting the pressed article from the mold.

I claim:—

1. In a glass forming machine, the combination of molds, a mold carrier, carrier actuating mechanism, means for moving said mechanism in reverse directions, a glass pressing plunger, a cylinder and piston for operating the plunger, valve 65 having fluid connections with opposite ends of the cylinder with one of said connections normally open for holding the plunger retracted, means actuated by the carrier-advancing mechanism during its carrier-advancing movement for operating valve 65 to close said normally open cylinder connection and means operated by the carrier-actuating mechanism during the same movement of the latter for operating valve 65 and thereby admitting fluid to the cylinder for causing the plunger to move to pressing position, and means actuated by the reverse movement of the carrier-actuating mechanism for restoring the parts actuated thereby to the respective positions occupied by them at the inception of the carrier-advancing movement.

2. In a glass forming machine, the combination of glass severing shears, a cylinder and piston for operating the same, valve 14 having fluid connections with said cylinder, piston and cylinder 45 with the upper end of the latter and one end of the shears operating cylinder connected to valve 14 for receiving fluid pressure therefrom simultaneously, molds, a mold carrier, fluid pressure actuated carrier-advancing mechanism, valve 77 actuated by the latter with said valve connected to the lower end of cylinder 45, valve 42 controlling the passage of fluid pressure to the carrier-advancing mechanism, and means connecting the piston of cylinder 45 and valve 42 for operating the latter.

3. In a glass forming machine, the combination of an intermittently movable mold carrier, molds thereon adapted, successively, to be placed in forming position, forming mechanism movable to and from mold-cooperating position, a cylinder and piston, means operatively connecting the piston and carrier for moving the latter, means actuated by the piston for causing the forming mechanism to move into operative relation with the mold, and means actuated by said piston for retracting the forming mechanism.

4. In a glass forming machine, the combination of a rotatable mold carrier, a cylinder, a piston and piston rod movable in the cylinder, means operatively connecting the piston rod and carrier during one reciprocation of the piston with said parts disengaged during the reverse reciprocation thereof, a valve for controlling the flow of motive fluid to opposite ends of the cylinder, fluid pressure means for actuating said valve in reverse directions, an initial valve movable in opposite directions and operatively connected to said actuating means and manually operated in one direction for passing fluid to the latter, means actuated by said piston rod for moving said valve actuating means in a reverse direction, and means actuated by said piston rod for restoring the initial valve to starting position.

5. In a glass forming machine, the combination of a mold carrier, molds thereon adapted, successively, to be placed in forming position, a cylinder and piston, means operatively connecting the piston and carrier for intermittently moving the latter, vertically movable forming mechanism, compressed air actuated means for actuating the forming mechanism in reverse directions, and a reversely movable valve actuated in reverse directions by the opposite movements of said piston for controlling said compressed air actuated means.

6. In a glass forming machine, the combination of a mold carrier, molds thereon adapted, successively, to be placed in forming position, a cylinder and piston, means operatively connecting the piston and carrier for intermittently moving the latter, vertically movable forming mechanism adapted to coöperate with the molds, compressed air actuated means for operating the forming mechanism, and two valves adapted to be actuated by said piston, one valve operatively connected to the forming mechanism actuating means for controlling the flow of fluid for depressing the forming mechanism, and the other valve operatively connected to the forming mechanism actuating means for controlling the flow of fluid for raising the forming mechanism.

7. In a glass forming machine, the combination of a mold, a plunger, plunger actuating means, and mechanisms operative interchangeably for causing either a quick or a more gradual withdrawal of the plunger from the mold.

8. In a glass forming machine, the combination of a mold, a plunger, a cylinder and piston with the piston operatively connected to the plunger, air admitting and exhausting connections for the opposite ends of the cylinder, a valve controlling said connections, means for actuating the valve in direction to cause the lowering of the plunger, and two means operative interchangeably for actuating the valve to raise the plunger, one of said valve-operating means effecting the withdrawal of the plunger immediately upon the latter entering the mold and the other of said means effecting the raising of the plunger after it has remained in the mold an appreciable time, 9. In a glass forming machine, the combination of an intermittently movable mold carrier, a device and means for moving said device in reverse directions, a bolt mounted on said device and adapted to engage the carrier for moving the latter with said device during the movement in one direction of the piston, a retractor engaged by the bolt at the completion of each forward movement of the carrier, a cylinder and piston with the piston operating to move the retractor, and means for controlling the admission and exhaust of air to said cylinder.

10. In a glass forming machine, the combination of an intermittently movable mold carrier, a cylinder and piston, an oscillating device actuated by the piston for advancing the carrier, a vertically movable spring-raised bolt carried by said device and adapted to engage the carrier, air admitting and exhausting pipes for opposite ends of said cylinder, a bolt retractor engaged by the bolt upon the completion of each forward movement of the carrier, a cylinder and piston with the piston connected to said retractor, and branch pipes connecting the opposite ends of said last mentioned cylinder with the pipes which extend to opposite ends of the carrier-actuating cylinder.

In testimony whereof I affix my signature in presence of two witnesses.

FRANK O'NEILL.

Witnesses:
H. L. Chollett,
W. T. Huntsman.